United States Patent [19]
Lee

[11] Patent Number: 5,984,322
[45] Date of Patent: Nov. 16, 1999

[54] VEHICLE LEVELLING DEVICE

[75] Inventor: Min Kyu Lee, Seoul, Rep. of Korea

[73] Assignee: Daewoo Heavy Industries Ltd., Incheon, Rep. of Korea

[21] Appl. No.: 08/901,732

[22] Filed: Jul. 28, 1997

[30] Foreign Application Priority Data

Jul. 27, 1996 [KR] Rep. of Korea ...................... 96-22382
Jul. 14, 1997 [KR] Rep. of Korea ...................... 97-32555

[51] Int. Cl.[6] .............................. B60G 17/01; B60G 9/02
[52] U.S. Cl. ................................ 280/6.159; 280/124.111; 280/124.116
[58] Field of Search ............................. 280/6.159, 6.157, 280/6.151, 6.15, 124.116, 124.111, 124.112, 5.513

[56] References Cited

U.S. PATENT DOCUMENTS

| | | | |
|---|---|---|---|
| 3,497,231 | 2/1970 | Fulmer et al. ........................ | 280/6.151 |
| 4,053,171 | 10/1977 | Hyler ................................. | 280/124.116 |
| 4,279,319 | 7/1981 | Joyce, Jr. .............................. | 280/6.159 |
| 4,340,235 | 7/1982 | Thompson ............................. | 280/6.159 |
| 5,063,512 | 11/1991 | Kamimura et al. ................... | 280/5.513 |
| 5,090,727 | 2/1992 | Kii et al. .............................. | 280/5.513 |
| 5,368,322 | 11/1994 | Korpimaa ............................. | 280/6.15 |

Primary Examiner—Peter C. English
Attorney, Agent, or Firm—Staas & Halsey

[57] ABSTRACT

A vehicle levelling device includes a vehicle body with a rear section and a rear axle carried under the rear section of the vehicle body to provide support therefor. A support yoke is hingedly mounted to the vehicle body for pivotal movement about a transverse axis in a vertical plane. The support yoke holds the rear axle in a manner that the rear axle can rotate about a longitudinal axis. A hydraulic cylinder is attached to the vehicle body at a first end and to the support yoke at a second end so that it can be operated to lower or raise the rear section of the vehicle body with respect to the rear axle to thereby bring a tilted forklift into a horizontal position. Operation of the hydraulic cylinder is controlled by an electronic controller which in turn receives a tilt signal from a tilt sensor.

8 Claims, 4 Drawing Sheets

VEHICLE LEVELLING DEVICE

FIELD OF THE INVENTION

The instant invention pertains generally to vehicles such as a loader and a forklift truck for hoisting and transporting cargos through the use of steel forks. More specifically, the invention is directed to a vehicle levelling device that lends itself to bring a forwardly tilted vehicle to a horizontal position by way of detecting the tilt angle of the vehicle which is loaded with heavyweight cargos.

BACKGROUND OF THE INVENTION

Forklift trucks have been used either to lift objects of relatively heavy weight up to an elevated location or to move the objects from one place to another within a limited working site. Depending on the power sources employed, the forklift trucks are classified into an engine-driven forklift truck which may usually operate in the outdoor area and an electromotive forklift truck which are suitable for indoor operation, thanks to its reduced or little emission of exhaust gas and noise. Another method of classifying the forklift trucks depends on the mobility of the mast assembly with respect to a vehicle body: a counterbalanced forklift truck whose mast assembly remains fixedly attached to the front end of the vehicle body; and a reach type forklift truck whose mast assembly is movable back and forth along reach legs with respect to the vehicle body. The counterbalanced truck is typically equipped with an internal combustion engine, while the reach type truck is provided with a counterweight and an electric motor and a battery feeding electricity to the motor, in which sense the latter is frequently referred to as an electromotive reach type forklift truck.

In case of the conventional, counterbalanced forklift truck, there is a tendency that a greater vertical load is applied to the front wheels than to the rear wheels as heavyweight cargos are loaded on the forwardly projecting forks. This means that the tire of the front wheels is crushed more heavily than the rear wheel tire, causing the forklift truck to be tilted forwardly, with the truck's center of weight shifted forwards in correspondence to the degree of slope. Such is particularly true when the cargo-loaded forklift truck moves on a downhill road. The forward shifting of the truck weight center makes the forklift truck unstable, sometimes resulting in the cargos dropped out of the forks and leading to the tumbling of the truck.

U.S. Pat. No. 5,368,322 to Korpimaa dated Nov. 29, 1994 teaches a truck spring suspension that includes hydraulic cylinders for causing a truck frame to be vertically moved between a suspended upper position and an unsuspended lower position, thus adjusting the height of the frame from the ground depending on the truck travelling condition. The truck spring suspension fails, however, to disclose or suggest an arrangement capable of returning a tilted truck frame into a horizontal position.

SUMMARY OF THE INVENTION

Accordingly, an object of the invention is to provide a vehicle levelling device that can substantially eliminate the drawbacks inherent in the prior art forklift truck.

Another object of the invention is to provide a vehicle levelling device capable of bringing a forwardly tilted vehicle into a horizontal position, thus avoiding any unwanted shifting of the vehicle weight center.

A further object of the invention is to provide a forklift truck of high stability which can automatically get back to a horizontal position immediately when it becomes tilted due to the cargo weight and/or downhill travel.

With these objects in view, there is provided a vehicle levelling device which includes a vehicle body with a rear section and a rear axle carried under the rear section of the vehicle body to provide support therefor. A support yoke is hingedly mounted to the vehicle body for pivotal movement about a transverse axis in a vertical plane. The support yoke holds the rear axle in a manner that the rear axle can rotate about a longitudinal axis. A hydraulic cylinder is attached to the vehicle body at a first end and to the support yoke at a second end so that it can be operated to lower or raise the rear section of the vehicle body with respect to the rear axle to thereby bring a tilted vehicle into a horizontal position. Operation of the hydraulic cylinder is controlled by an electronic controller which in turn receives a tilt signal from a tilt sensor.

BRIEF DESCRIPTION OF THE DRAWINGS

The above and other objects, features, and advantages of the invention will become apparent from a review of the following detailed description of the preferred embodiment taken in conjunction with the accompanying drawings, in which.

DETAILED DESCRIPTION OF THE PREFERRED EMBODIMENT

It should be understood that the present invention may be advantageously applied to any type of vehicles that can lift or load cargos, bulk materials and the like with working implements provided at the front end of the vehicle. Examples of such vehicle include, but are not limited to, forklift trucks and wheel loaders.

Figure 1:
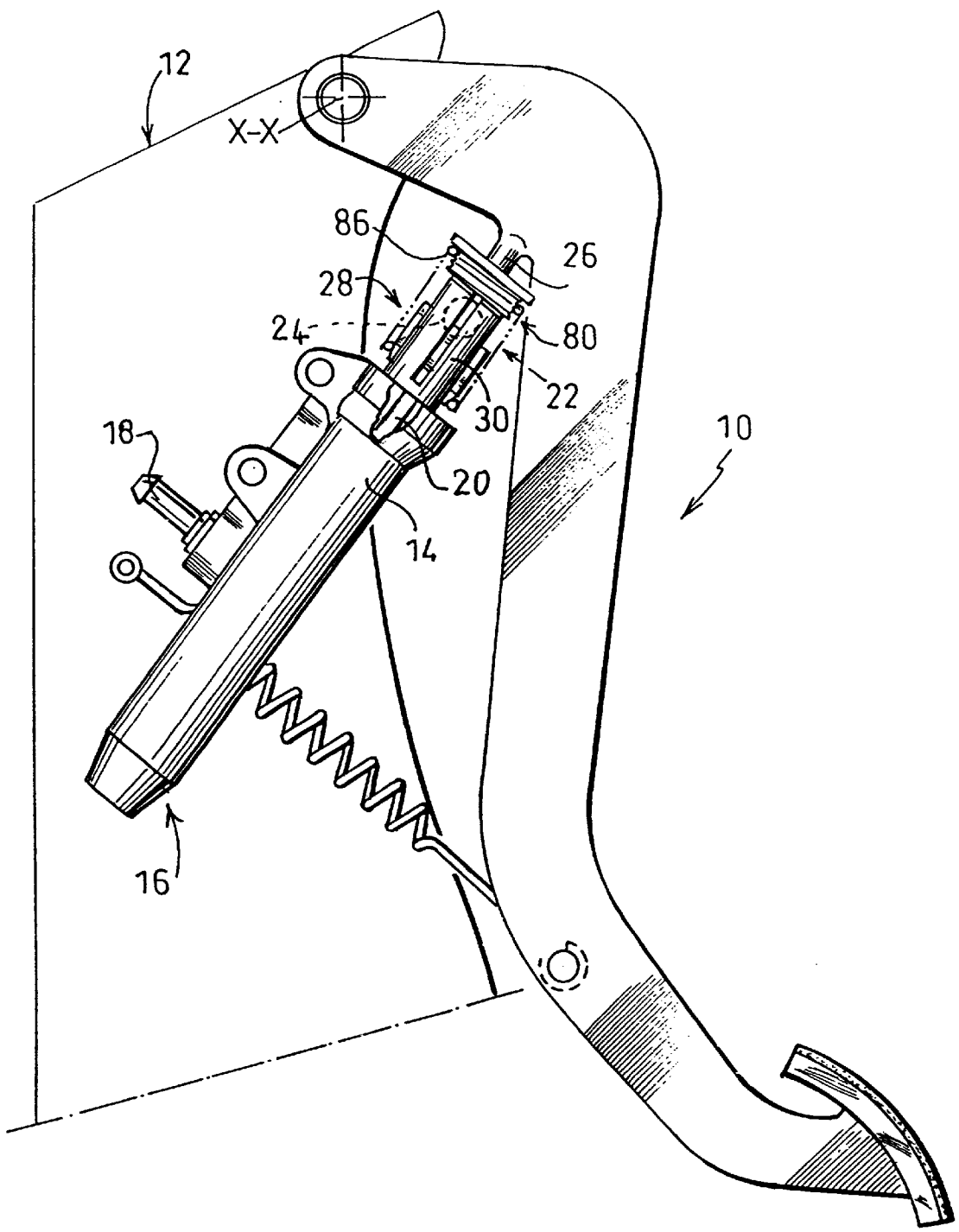
FIG. 1 is a partially cutaway side elevational view of a forklift truck employing a vehicle levelling device in accordance with the invention.

Referring now to FIG. 1, it can be seen that a forklift truck incorporating the inventive levelling device includes a truck body 10 supported by front drive wheels 12 attached to a front axle 11 and rear steerable wheels 14. Mounted to the frontal end of the truck body 10 is a mast 16 which may be subjected to tilting movement by means of a tilt cylinder 18. A carriage 20 with forwardly projecting forks 22 is elevationally movably attached to the mast 16, which elevational movement may be effected with a lift cylinder not shown in the drawings. A counterweight 24 is fixedly secured to the rear end of the truck body 10 so as to maintain balance with the cargo loaded on the forks 22. For the safety purpose, an overhead guard 26 extends upwardly from the truck body 10 to protect the driver from any falling object.

Figure 2:
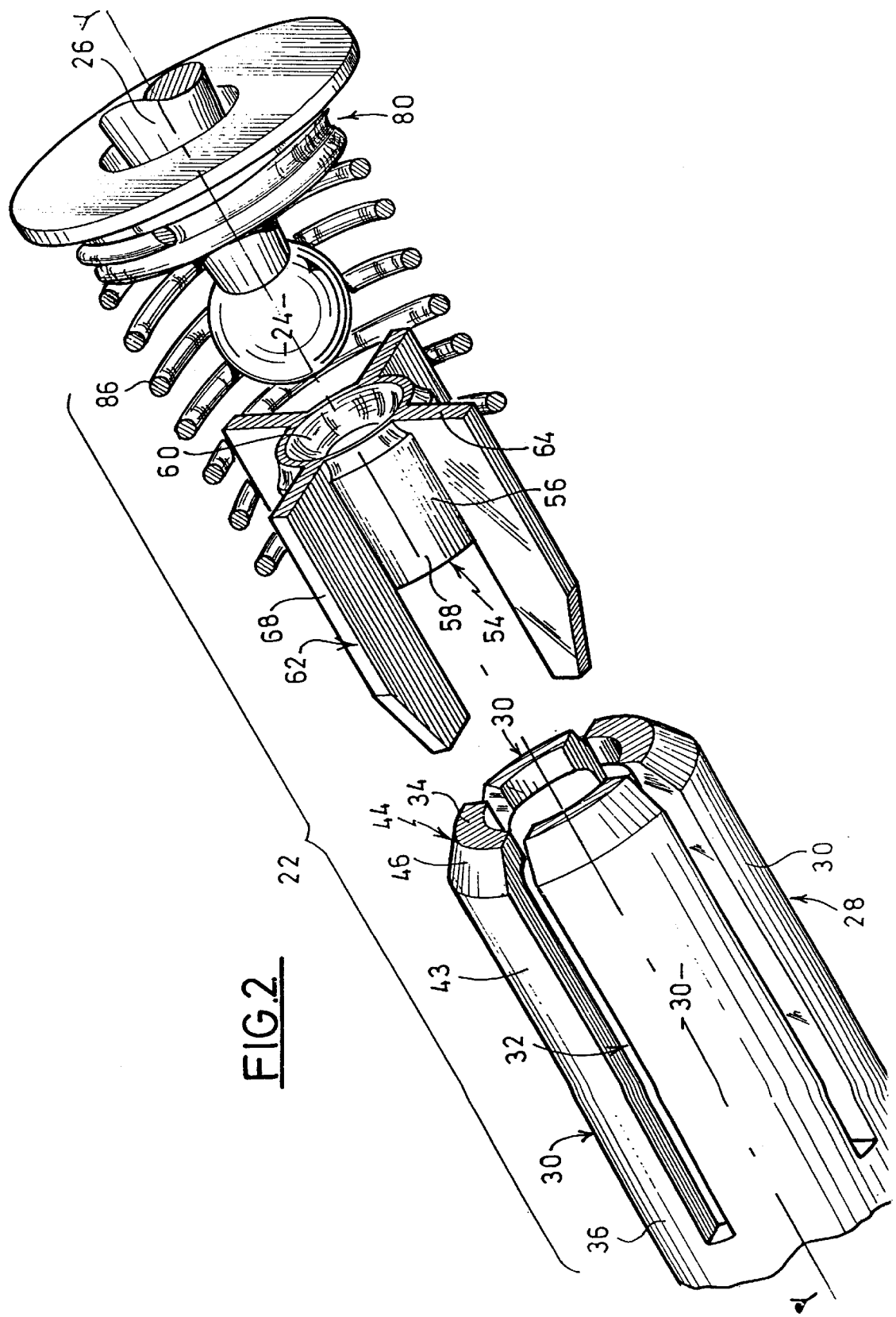
FIG. 2 is an enlarged view showing the vehicle levelling device in accordance with the invention, with portions of a vehicle body and a rear wheel removed for clarity.
Figure 3:
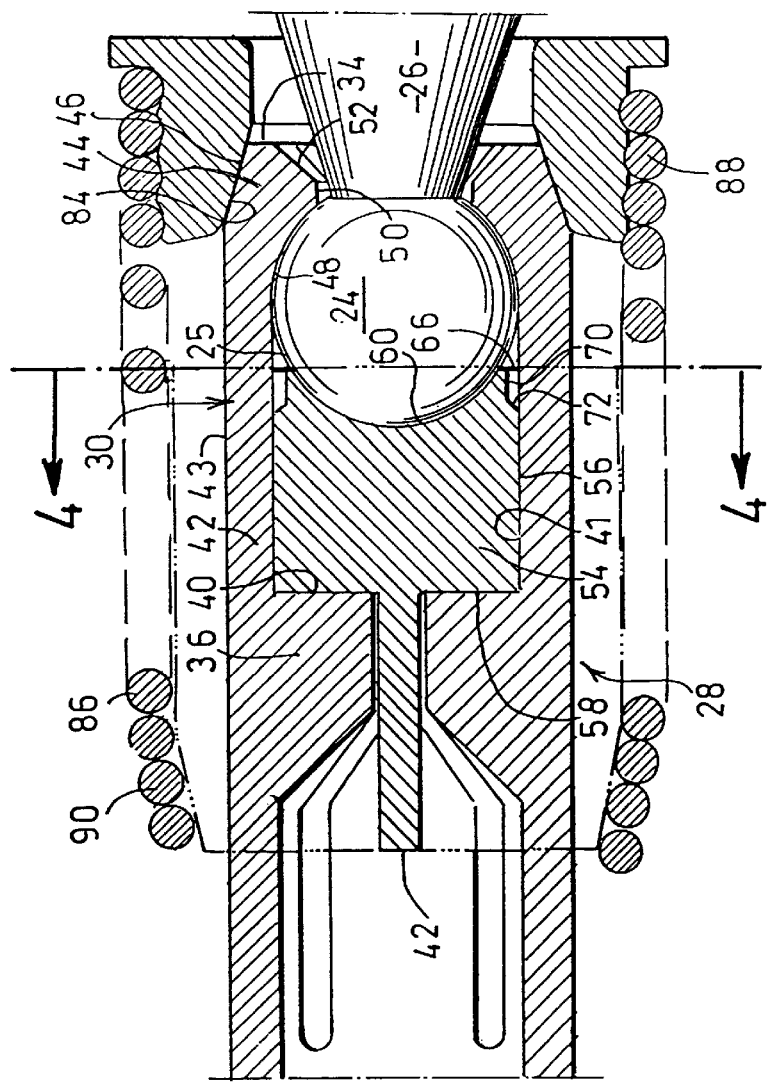
FIG. 3 is an exploded perspective view best illustrating the vehicle levelling device in accordance with the invention.

As clearly shown in FIGS. 2 and 3, a vehicle levelling device generally designated at 28 is provided under the rear section of the truck body 10 to keep the truck body 10 horizontal. The levelling device 28 includes a support yoke 30 attached to the truck body 10 for swinging movement about a transversely extending hinge pin 32 in a generally vertical plane. Extending in the longitudinal direction of the forklift truck, the support yoke 30 has a pair of spaced apart journal portions 34, 36 respectively provided at the proximal and distal ends thereof. Each of the journal portions 34, 36 is provided with an integral collar 38 of semicircular configuration facing downwards and a separable collar 42 detachably combined with the integral collar 38 as by bolts 40. A rear axle 44 with rear wheels 14 at opposite ends is mounted to the journal portions 34, 36 so that it can be subjected to rolling motion about a longitudinal shaft 46.

The support yoke 30 is connected at its intermediate portion to the truck body 10 through a double acting hydraulic cylinder 48. The hydraulic cylinder 48 is composed of a cylinder housing 50 and a cylinder rod 52 extendibly fitted to the cylinder housing 50. The cylinder housing 50 is attached to the truck body 10 by virtue of a pivot pin 54, while the cylinder rod 52 is secured to the support yoke 30 through a pivot pin 56. Extension of the cylinder rod 52 will raise the rear section of the truck body 10 away from the rear axle 44. To the contrary, retraction of the cylinder rod 52 will allow the rear section of the truck body 10 to be lowered toward the rear axle 44.

Figure 4:
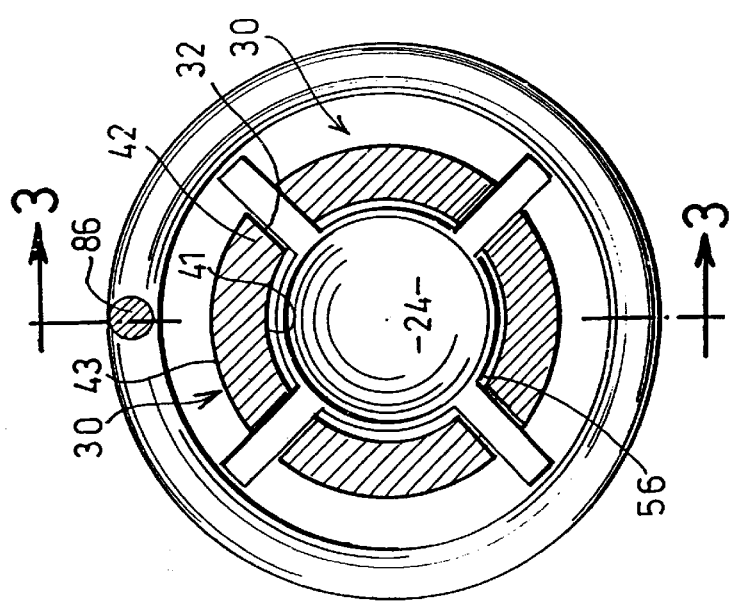
FIG. 4 shows a hydraulic circuit adapted to control the flow of pressurized fluid which is to be fed to a hydraulic cylinder in the vehicle levelling device.

Turning to FIG. 4, it will be appreciated that the cylinder housing 50 has a first pressure chamber 58 and a second pressure chamber 60 each receiving pressurized fluid either to retract or extend the cylinder rod 52. The first and second pressure chambers 58, 60 are respectively coupled to first and second outlet ports 62a, 62b of an electromagnetic directional control valve 62 whose position is shifted by first and second solenoids 64, 65. Normally remaining in a neutral position, the directional control valve 62 may be shifted, upon energization of the solenoids 64, 65, to a first operative position or a second operative position wherein the pressurized fluid is admitted into the first or second pressure chamber 58, 60 of the hydraulic cylinder 48.

It can be also noted that the directional control valve 62 has a first inlet port 62c leading to a fluid pump 68 by way of a priority valve 66 and a second inlet port 62d communicating with a fluid reservoir 72 through a fluid filter 70. The priority valve 66 serves to feed the fluid discharged by the fluid pump 68 preferentially to a steering valve unit 74 and then permit the surplus fluid to go to a working implement valve unit 76, thus assuring safe and stable steering operation. The working implement valve unit 76 is adapted to distribute the pressurized fluid to such working implements as a lift cylinder, a tilt cylinder and a hydraulic drive motor not shown in the drawings.

A tilt angle sensor 78 is utilized to generate tilt signals in case where the truck body 10 is inclined in the longitudinal direction, followed by an unwanted shifting of the weight center of the forklift truck. The tilt angle sensor 78 provides an electronic controller 80 with information regarding the tilt direction and amount of the truck body 10, in response to which the electronic controller 80 will issue drive signals to either of the solenoids 64, 65 to thereby shift the position of the directional control valve 62. Unlike the illustrated embodiment, it would be possible to remove the tilt angle sensor 78 and, instead, add an electric switch which may be manually operated to activate the first and second solenoids 64, 65.

Figure 5:
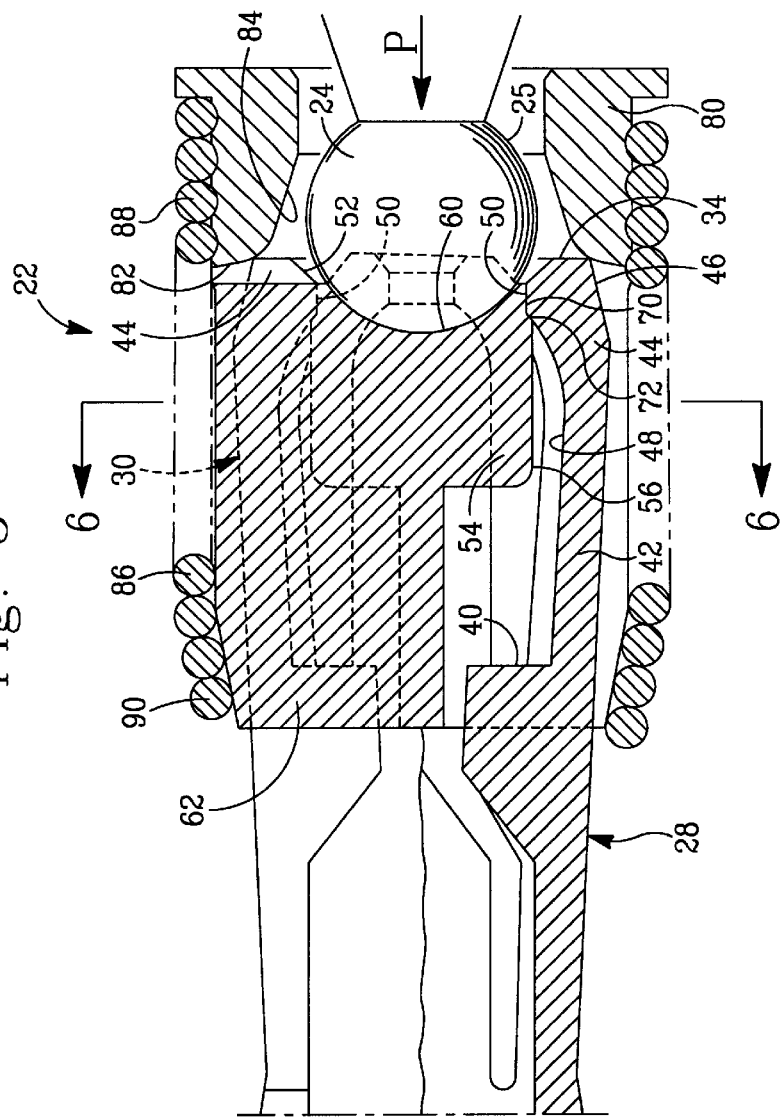
FIG. 5 shows the forward tilting motion of the forklift truck and the resultant shifting of the weight center which occurs when a heavyweight cargo is loaded on the forks.
Figure 6:
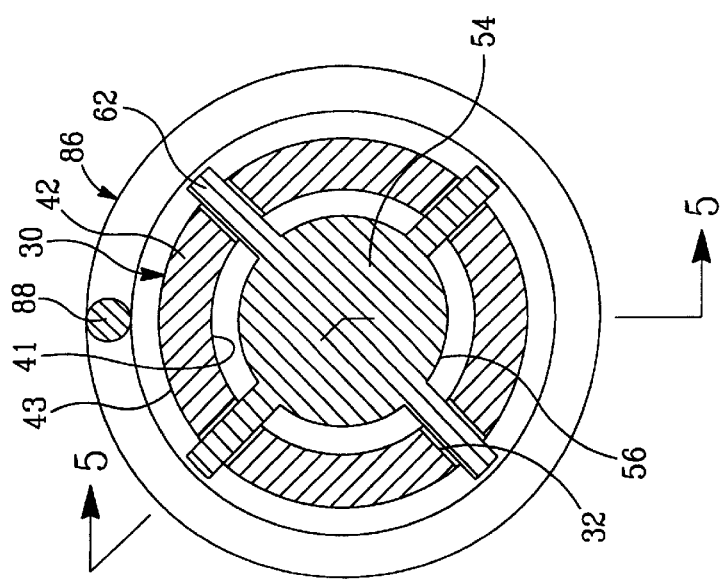

Operation of the vehicle levelling device 28 will now be set forth in more detail. As schematically illustrated in FIG. 5, the truck body 10 will be tilted forwardly at an angle of α with the weight center C1 of the forklift truck moving forwardly and upwardly into another one C2, in the event that the forklift truck is loaded with a heavyweight cargo on the forks 22. This would significantly reduce the stability of the forklift truck especially when it runs on a downhill road.

At the very moment, the tilt angle sensor 78 shown in FIG. 4 only will apply a positive tilt signal to the electronic controller 80 which in turn activates the first solenoid 64 in a first direction so as to cause the directional control valve 62 to be shifted rightwards in FIG. 4. This allows the pressurized fluid in the fluid pump 68 to be supplied to the first pressure chamber 58 of the hydraulic cylinder 48 via the first inlet port 62c and the first outlet port 62a of the directional control valve 62. Concurrently with such fluid supply, the fluid in the second pressure chamber 60 of the hydraulic cylinder 48 will be drained to the fluid reservoir 72 via the second outlet port 62b and the second inlet port 62d of the directional control valve 62. The result of such fluid supply and drainage is that the cylinder rod 52 of the hydraulic cylinder 48 retracts to lower the rear section of the truck body 10. As the truck body 10 is brought into a horizontal position and hence the weight center is returned from C2 back to C1, the tilt angle sensor 78 will no longer generate any tilt signal such that the electronic controller 80 can deactivate the first solenoid 64 to shift the directional control valve 62 into a neutral position. Thus the hydraulic cylinder 48 is inhibited from any inadvertent retraction or extension while the forklift truck remains substantially in a horizontal position.

Unloading the cargo out of the forks 22 will cause the truck body 10 to be tilted backwardly in proportion to the retraction amount of the hydraulic cylinder 48, in response to which the tilt angle sensor 78 feeds a negative tilt signal to the electronic controller 80. The electronic controller 80 will thus activate the second solenoid 65 in a second direction whereby the directional control valve 62 can be shifted leftwards in FIG. 4. As a result, the pressurized fluid in the fluid pump 68 is supplied to the second pressure chamber 60 of the hydraulic cylinder 48 by way of the first inlet port 62c and the second outlet port 62b of the directional control valve 62, while the fluid in the first pressure chamber 58 is drained to the fluid reservoir 72 through the first outlet port 62a and the second inlet port 62d of the directional control valve 62.

The result is that the cylinder rod 52 of the hydraulic cylinder 48 extends to raise the rear section of the truck body 10, bringing the unloaded forklift truck into a horizontal position wherein the tilt angle sensor 78 issues no tilt signal. This enables the electronic controller 80 to deactivate the second solenoid 65 so that the directional control valve 62 may come back to the neutral position to cut off the fluid flow therethrough.

While the invention has been shown and described with reference to a preferred embodiment, it should be apparent to one of ordinary skill in the art that many changes and modifications may be made without departing from the spirit and scope of the invention as defined in the claims.

What is claimed is:

1. A vehicle levelling device adapted to return a vehicle to a horizontal position by way of adjusting the height of a rear section of a vehicle body relative to a rear axle, comprising:

a support yoke hingedly mounted to the vehicle body for pivotal movement about a transverse axis in a vertical plane, the support yoke rotatably holding the rear axle;

an actuator attached to the vehicle body at a first end and to the support yoke at a second end for causing the rear section of the vehicle body to move up and down with respect to the rear axle, the actuator having first and second pressure chambers; and actuator control means for detecting a tilt angle of the vehicle body and for supplying pressurized fluid to the first or second pressure chamber of the actuator when the vehicle body is determined to be tilted.

2. The vehicle levelling device as recited in claim 1, wherein the actuator control means comprises a fluid pump, a fluid reservoir, an electromagnetic directional control valve operable to selectively connect the first and second pressure chambers to the fluid pump or the fluid reservoir, means for detecting the tilt angle of the vehicle body to produce a tilt signal when the vehicle body is determined to be tilted; and an electronic controller responsive to the tilt signal for shifting the electromagnetic directional control valve to allow the pressurized fluid to enter one of the first and second pressure chambers of the actuator.

3. The vehicle levelling device as recited in claim 2, wherein the electromagnetic directional control valve is provided with first and second solenoids each electrically associated with the controller for, when activated, shifting the control valve to a first operative position or a second operative position out of a neutral position.

4. The vehicle levelling device as recited in claim 1, wherein the actuator comprises a double acting hydraulic cylinder.

5. A vehicle levelling device, comprising:

a vehicle body with a rear section;

a rear axle carried under the rear section of the vehicle body to provide support therefor;

a support yoke hingedly mounted to the vehicle body for pivotal movement about a transverse axis in a vertical plane, the support yoke rotatably holding the rear axle;

a hydraulic cylinder attached to the vehicle body at a first end and to the support yoke at a second end for causing the rear section of the vehicle body to move up and down with respect to the rear axle, the hydraulic cylinder provided with first and second pressure chambers; and cylinder control means for detecting a tilt angle of the vehicle body and for supplying pressurized fluid to the first or second pressure chamber of the hydraulic cylinder, when the vehicle body is determined to be tilted, to bring the vehicle body into a horizontal position.

6. The vehicle levelling device as recited in claim 5, wherein the cylinder control means comprises a fluid pump, a fluid reservoir, and electromagnetic directional control valve operable to selectively connect the first and second pressure chambers to the fluid pump or the fluid reservoir, means for detecting the tilt angle of the vehicle body to produce a tilt signal when the vehicle body is determined to be tilted; and an electronic controller responsive to the title signal for shifting the electromagnetic directional control valve to allow the pressurized fluid to enter one of the first and second pressure chambers of the hydraulic cylinder.

7. A forklift truck, comprising:

a truck body with front and rear sections;

front and rear axles carried under the truck body to respectively support the front and rear sections of the truck body;

a support yoke hingedly mounted to the truck body for pivotal movement about a transverse axis in a vertical plane, the support yoke rotatably holding the rear axle;

a hydraulic cylinder attached to the truck body at a first end and to the support yoke at a second end for causing the rear section of the truck body to move up and down with respect to the rear axle, the hydraulic cylinder provided with first and second pressure chambers; and control means for detecting a tilt angle of the truck body and for supplying pressurized fluid to the first or second pressure chamber of the hydraulic cylinder, when the truck body is determined to be tilted, to bring the truck body into a horizontal position.

8. The forklift truck as recited in claim 7, wherein the cylinder control means comprises a fluid pump, a fluid reservoir, an electromagnetic directional control valve operable to selectively connect the first and second pressure chambers to the fluid pump or the fluid reservoir, means for detecting the tilt angle of the truck body to produce a tilt signal when the truck body is determined to be tilted; and an electronic controller responsive to the tilt signal for shifting the electromagnetic directional control valve to allow the pressurized fluid to enter one of the first and second pressure chambers of the hydraulic cylinder.

* * * * *